Figure 1:
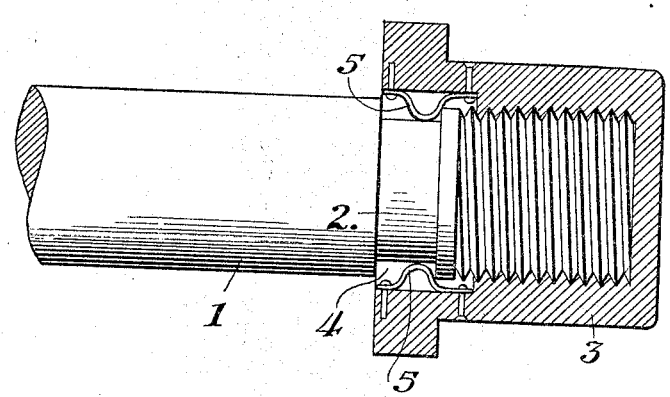

S. F. SOSH.
NUT LOCK.
APPLICATION FILED MAR. 24, 1917.

1,237,400.

Patented Aug. 21, 1917.

WITNESS
Howard V. Yarus

INVENTOR
S. F. Sosh
BY Victor J. Evans
ATTORNEY

UNITED STATES PATENT OFFICE.

STEPHEN F. SOSH, OF MOUNT CARMEL, PENNSYLVANIA.

NUT-LOCK.

1,237,400.  Specification of Letters Patent.  Patented Aug. 21, 1917.

Application filed March 24, 1917. Serial No. 157,147.

*To all whom it may concern:*

Be it known that I, STEPHEN F. SOSH, a citizen of the United States, residing at Mount Carmel, in the county of Northumberland and State of Pennsylvania, have invented new and useful Improvements in Nut-Locks, of which the following is a specification.

The present invention relates to a simple, cheap and effective means for locking a nut and bolt.

In carrying out my invention it is my purpose to produce an ordinary bolt and a nut therefor, the said nut being preferably, however, of a greater length than the ordinary nut and being provided upon its inner face with an annular depression or chamber communicating with the bore thereof, and within this chamber I secure the opposite ends of a flat spring to bow the middle of the said springs, while I provide the bolt beyond the threads thereof with a continuous groove that is designed to receive the bulged portion of the spring of the nut when the nut is screwed home upon the bolt.

With the above and other objects in view the improvement resides in the construction, combination and arrangement of parts set forth in the following specification and falling within the scope of the appended claim.

Figure 2:
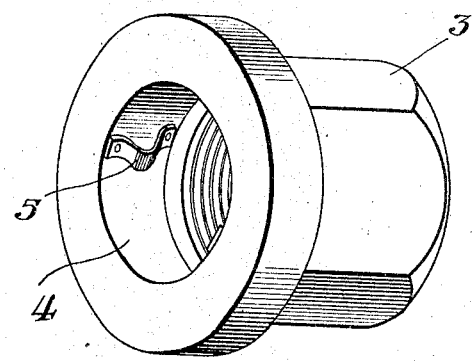

In the drawing:

Figure 1 is an approximately central sectional view through the nut in its applied position upon the bolt, and Fig. 2 is a perspective view looking toward the inner face of the nut.

In the drawing the numeral 1 designates an ordinary bolt that has its shank at the terminal of its threads formed with a continuous depression 2.

The nut is indicated by the numeral 3 and has its inner face centrally provided with an enlarged depression or annular chamber 4 that communicates with the threaded bore of the said nut, and within this chamber is secured the opposite ends of one or more flat springs 5 whereby to centrally bulge the said springs. The springs are designed to enter the groove in the bolt when the nut is screwed home upon the bolt, and by this means to effectively connect the nut to the bolt.

From the above description, taken in connection with the accompanying drawing, the simplicity of the device, as well as the advantages thereof will, it is thought, be perfectly apparent to those skilled in the art to which such invention appertains without further detailed description.

Having thus described the invention, what I claim is:

The combination with a bolt having its shank provided with a transverse continuous groove at the terminal of its threads, and a nut for the bolt, said nut having its inner face formed with a continuous annular depression communicating with the bore of the said nut, a flat spring having its opposite ends secured within the said depression whereby to bulge the central portion of the spring, and the said bulged portion of the spring designed to enter the groove of the bolt to lock the nut to the bolt when the said nut is screwed home upon the bolt.

In testimony whereof I affix my signature.

STEPHEN F. SOSH.